United States Patent [19]
Schmidt

[11] 3,802,288
[45] Apr. 9, 1974

[54] TRANSMISSION

[76] Inventor: Gerrit Schmidt, 12 Fazantenlaan, Rhoon, Netherlands

[22] Filed: Aug. 7, 1972

[21] Appl. No.: 278,451

[30] Foreign Application Priority Data
Aug. 13, 1971   Netherlands...................... 7111171
Nov. 24, 1971   Netherlands...................... 7116148

[52] U.S. Cl. ............................................... 74/393
[51] Int. Cl. ............................................ F16h 35/02
[58] Field of Search ............................ 74/393, 800

[56] References Cited
UNITED STATES PATENTS
3,428,839   2/1969   Singleton et al.................. 74/800 X

*Primary Examiner*—Leonard H. Gerin
*Attorney, Agent, or Firm*—Kurt Kelman

[57] ABSTRACT

A transmission in which a rotation of one or more gears and a rotation of at least one annular set of pinions imparted by a swash plate through a screw spindle system are superposed to effect a stepless variable transmission.

3 Claims, 2 Drawing Figures

TRANSMISSION

BACKGROUND OF THE INVENTION

This invention relates to a transmission which is substantially mechanical but may be combined with fluid drive elements.

It has some resemblance to an axial fluid motor using an adjustable swash plate and an annular set of cooperating plungers operated by fluid to be delivered by a pump. A disadvantage of such a fluid device is its low efficiency.

SUMMARY OF THE INVENTION

According to the present invention an annular set of pinions are used instead of plungers, to be operated by the swash plate through a screw spindle system for a mechanical transmission which does not require an operating fluid to be delivered by a pump. An input rotation imparted by a power source is combined with an additional rotation of the respective pinions derived from an axial translation of the screw spindle system under the action of the swash plate to produce an output rotation, with the speed ratio between the input and output rotations thus being variable in a stepless manner.

A great advantage of the new transmission is its high efficiency compared with a fluid transmission. In contrast to axial plunger pumps and hydromotors which have their maximum output when the pivot angle of the swash plate is a maximum, according to the invention the output is increased when the pivot angle of the swash plate is decreased. At an angle of 0° the transmission ratio will be 1 : 1 so that a direct gear transmission will be effected.

Further advantages of the present transmission are its simple control and compactness.

In one embodiment of the invention a rotation of an input gearing is transferred by one or more eccentric ring sets of pinions, said pinions maintaining a predetermined original radial position with respect to their own axes when the pinion ring is rotating, but being adapted to derive an additional rotation about their axes from an adjustable swash plate, which is concentric with the pinion ring, through a screw spindle drive connected to each of the pinions to transform a periodic translation derived from the swash plate and being variable in dependence of the adjusted position of the swash plate in a periodic rotation of the pinions about their axes, which periodic rotation is superposed on the transferred rotation to effect a stepless variable transmission.

In another embodiment the screw spindle system is combined with free wheel couplings in order to transform the periodic translation of a spindle due to the relative pivotal motion of the swash plate in a continuous rotation of the pinions about their axes. A further aspect thereof may be that the spindles are connected to the swash plate by a fluid coupling which reduces the cyclic irregularity of the transferred motion and is self-compensating under excessive forces.

Further objects and advantages of the invention will be apparent from the following specification and the accompanying drawings.

DESCRIPTION OF THE PREFERRED EMBODIMENTS

Figure 1:
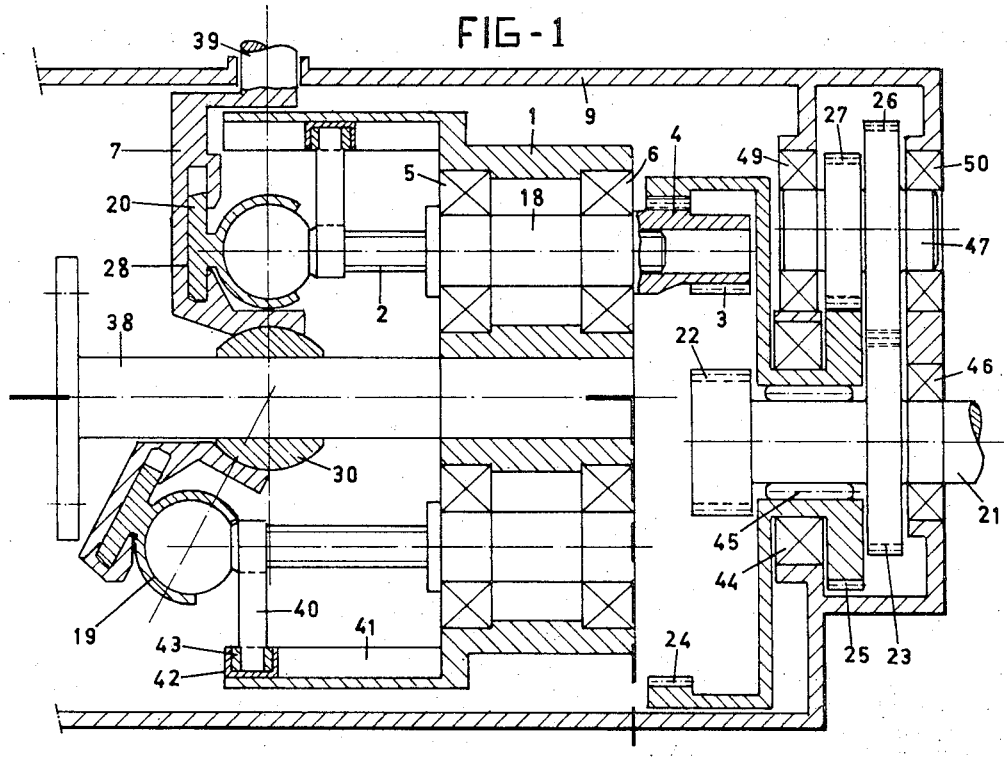
FIG. 1 is a longitudinal section of a preferred embodiment of the transmission, taken through the pivot axis of the swash plate in the upper half of the drawing, combined with a longitudinal section at right angles thereto, in the lower half of the drawing and FIG. 2 are similar longitudinal sections showing a detail of a further embodiment.

In FIG. 1 a rotary housing 1 is driven by an input shaft 38 which is connected to a motor (not shown). An annular set of screw spindles 2 is arranged within the housing 1. Each of the screw spindles cooperates with a nut 18, and each of the nuts 18 is journaled in bearings 5 and 6 in the housing 1.

Secured to the nuts 18 are small pinions 3 and larger pinions 4, and since the nuts 18 are axially restrained in the housing 1, the nuts 18 and the pinions 3 and 4 are rotated when the screw spindles 2 are axially moved by a swash plate 7 which is pivotally mounted on a ball pivot 30 on the input shaft 38 through which the housing 1 is driven. The swash plate 7 is connected through a pivot shaft 39 to a stationary casing 9 surrounding the rotary housing 1.

The axially movable screw spindles 2 are coupled to the swash plate 7 by means of ball joints comprising ball heads 19 on the screw spindles 2, and ball receiving slide plates 20 which are adapted to pivot on the ball heads 19 and to slide in an annular sliding recess 28 in the swash plate 7 so that when the disc is tilted about its pivot shaft 39 the respective screw spindles 2 are subjected to a periodic axial translation while transferring a periodic rotation to the pinions 3 and 4.

It is noted that the rotation of the pinions 3 and 4 about their own axes may also be effected by means of a central worm wheel on the input shaft and worms on the pinion shafts, which embodiment has not been shown.

Each of the screw spindles 2 is guided in its longitudinal motion by a follower 40 in an axial guide track 41 in the housing 1 thereby preventing a rotation of the spindles 2 about their own axes.

A resilient means is provided between the follower 40 and the guide track 41 to cushion the motions, said resilient means comprising a rubber sleeve 43 which is retained in a steel bushing 42.

The small pinions 3 are engaged by a gear 22 and the larger pinions 4 by a gear 24. The gear 24 is journaled in the stationary casing 9 by means of a bearing 44. Secured to the gear 24 is a gear 25. The output shaft 21 on which the gear 22 is mounted, extends through the gear 24 and is journaled therein by a roller bearing 45. Secured on the shaft 21 is a gear 23. The end of the shaft 21 is journaled in the stationary casing 9 by a bearing 46. The gears 23 and 25 are meshing with gears 26 and 27, respectively, which are secured on the shaft 47 which is journaled in the stationary casing 9 by means of bearings 49 and 50.

Figure 2:
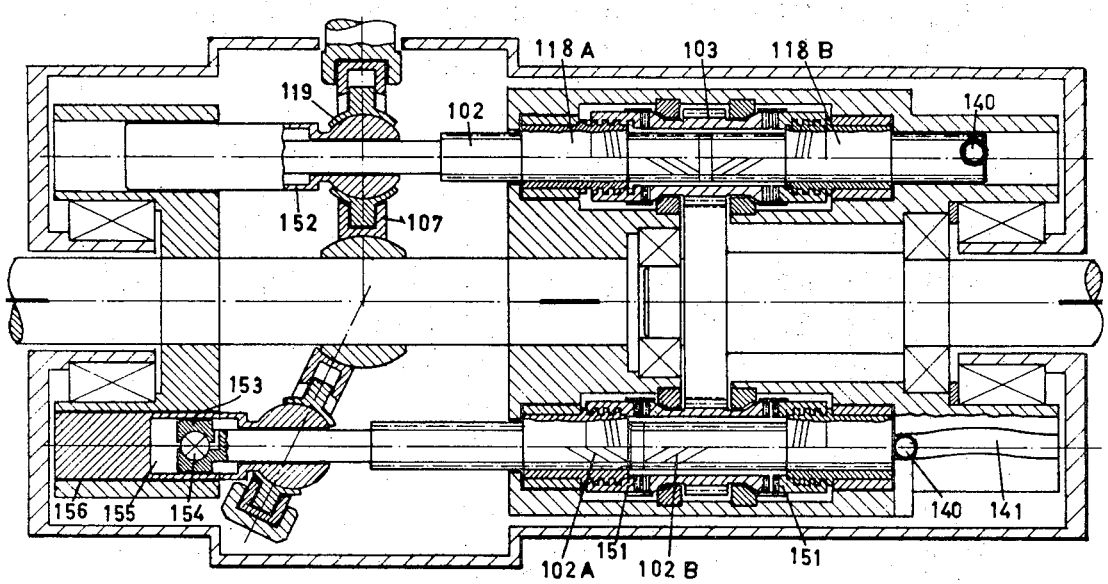

In another embodiment shown in FIG. 2 the periodic translation is converted by the screw spindle system 102 to a periodic rotation as in the previous embodiments. In this case the pinions 103 are not fixedly secured to a nut as in the previous embodiments, however, but are operated by two nuts 118A and 118B, one on each side thereof, through two axial free wheel couplings 151 which operate alternately. The spindles 102 have a right threaded portion 102A and a left threaded portion 102B so that both its forward stroke and its return stroke are converted by the two nuts 118A and 118B in a continuous rotation of the pinions 103.

In FIG. 2 is also seen that the spindles 102 are extended through the ball joints 119 to provide a non-rigid but resilient connection between the swash plate 107 and the spindles 102 in the form of a fluid coupling 152 which is adapted to be self-compensating under excessive forces, and reduces the cyclic irregularity of the transferred motion, said fluid couplings 152 comprising a plunger 153 which is provided with a check valve 154 controlling the fluid motion through interconnecting passages (not shown) between the fluid chambers 155, and having slide bushes 156, which provisions are useful to limit the axial force on the spindles 102.

A further aspect of the embodiment according to FIG. 2 is the slightly curved guide track 141 in which the follower 140 rides, said light curvature tending to reduce the cyclic irregularity of the transferred motion.

It is noted that each pinion may also be fixedly secured to a nut, and in constant mesh with an output gear which is connected with the output shaft through an overriding clutch. This embodiment has not been shown.

What is claimed is:

1. A transmission which comprises an input drive shaft, a rotary housing driven by said input drive shaft, a set of screw spindles, each of said spindles annularly disposed relative to said shaft to cooperate with a nut, each nut being journaled in bearings for rotation in said rotary housing and being axially restrained in said housing, a swash plate pivotally mounted on a ball pivot which ball pivot is secured on the input drive shaft, said swash plate having a pivot shaft rotatably mounted in a stationary casing surrounding said rotary housing, said spindles each being coupled to said swash plate by a ball joint comprising a ball head joined to the spindle, said ball head disposed to move cyclically and axially relative to said nuts, spindle follower means joined to each spindle and movable in an axial guide track, said spindle follower means disposed to prevent rotation of the spindle to which it is joined about the spindle axis such that the nuts rotate when the spindles are axially moved, at least one pinion concentrically secured for rotation with a nut, an output shaft eccentrically journaled in said stationary casing with respect to said rotary housing, at least one gear mounted for rotation with the output shaft and engaging the pinion on said nut to be rotated, whereby additional rotation of the pinion about its axes as a result of a pivoted position of said swash plate is superposed on the rotation of the rotary housing, which additional rotation is transmitted to the gear on the output shaft to effect a stepless variable rotation.

2. A transmission which comprises an input drive shaft, a rotary housing driven by said input drive shaft, a set of axially movable screw spindles having left and right threaded portions, each of said spindles annularly disposed relative to said shaft to cooperate respectively with a left and a right threaded nut, each nut being journaled in bearings for rotation in said rotary housing and being axially restrained in said housing, a swash plate pivotally mounted on a ball pivot which ball pivot is secured on the input drive shaft, said swash plate having a pivot shaft rotatably mounted in a stationary casing surrounding said rotary housing, said spindles each being coupled to said swash plate by a ball joint comprising a ball head joined to the spindle, said ball head disposed to move cyclically and axially relative to said nuts, spindle follower means joined to each spindle and movable in an axial guide track, said spindle follower means disposed to prevent rotation of the spindle to which it is joined about the spindle axis such that the nuts rotate when the spindles are axially moved, a pinion concentrically and rotatably connected to each of the pair of nuts of each spindle, one nut of each pair being disposed on axially opposite sides of the pinion, the pinion operated through two axial free wheel couplings which operate alternately such that both a forward stroke and a return stroke of said spindles are converted by each pair of nuts for a continuous rotation of said pinion, an output shaft concentrically journaled in said stationary casing with respect to said rotary housing, and a gear mounted for rotation with said output shaft and engaging said pinion to be rotated whereby the additional rotation of said pinion about its own axis as a result of a pivoted position of said swash plate is superposed on the rotation of said housing, which additional rotation is transmitted to the gear on the output shaft to effect a stepless variable rotation.

3. The transmission of claim 2 wherein the spindles are coupled to the swash plate by a fluid coupling.

* * * * *